July 7, 1970  G. TOMELLERI  3,519,049

APPARATUS FOR DESTEMMING FRUITS AND BERRIES

Filed May 16, 1967

Inventor

GIORDANO TOMELLERI

By Shoemaker and Mattare
Attorneys

July 7, 1970  G. TOMELLERI  3,519,049
APPARATUS FOR DESTEMMING FRUITS AND BERRIES
Filed May 16, 1967  2 Sheets-Sheet 2

INVENTOR
GIORDANO TOMELLERI

BY *Shoemaker and Mattare*

ATTORNEYS

United States Patent Office 3,519,049
Patented July 7, 1970

3,519,049
APPARATUS FOR DESTEMMING FRUITS
AND BERRIES
Giordano Tomelleri, Via Montorio 22,
Verona, Italy
Filed May 16, 1967, Ser. No. 638,872
Int. Cl. A23n 15/02
U.S. Cl. 146—55                                3 Claims

ABSTRACT OF THE DISCLOSURE

A device for causing fruits and berries to be fed down an inclined surface or be moved across an undulating surface in such a manner that the stems of the fruits and berries are caught in the surface and removed from the fruit and berry by a pulling action while simultaneously therewith the fruit or berry is engaged below the center thereof and held by a moving surface which also feeds the same along the surface and with the fruit or berry being slightly bent or moved from the vertical whereupon the fruit or berry will not be pulled through the stem grasping means or be crushed or bruised thereby.

Heretofore, fruits and berries have been destemmed by mechanical means, but the destemming means produces such a pull on the stem that ofttimes the berry or fruit is pulled into the destemming means or towards it to such a point that the fruit or berry is partially or completely damaged.

Applicant's apparatus while destemming the fruit or berry has a means for holding the same and slightly bending the same from its vertical point while feeding it across the destemming means so that the fruit or berry is not pulled into the destemming means with consequent damage to the fruit or berry. Thus, the stem can be removed from the fruit or berry with substantially half of the force heretofore needed when the fruit or berry was not held against the pull of the destemming means.

Therefore, it is an object of this invention to destem fruits or berries of a delicate nature by a destemming means while the fruit or berry is held against the pull of the destemming means and even slightly bent from the vertical and lifted during the destemming operation.

Figure 1:
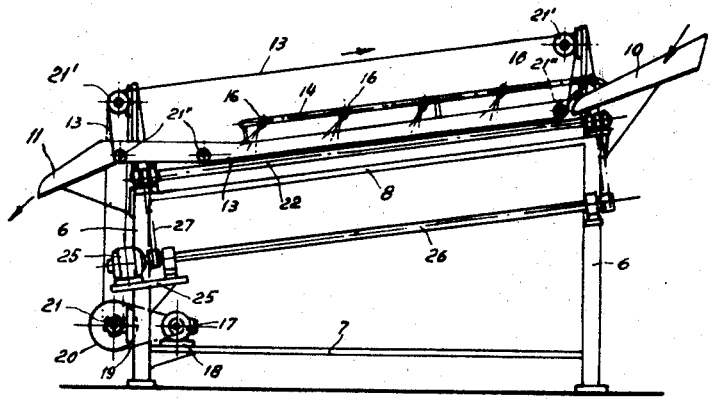
Figure 2:
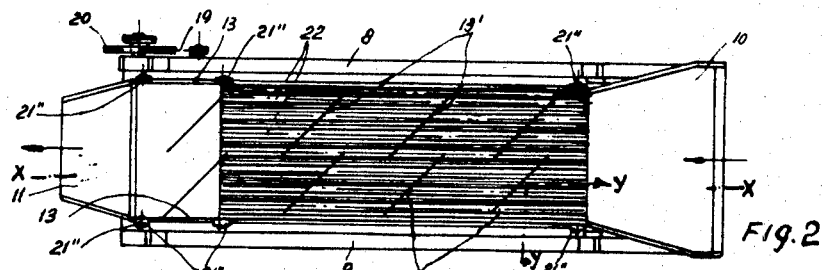
Figures 3, 4:
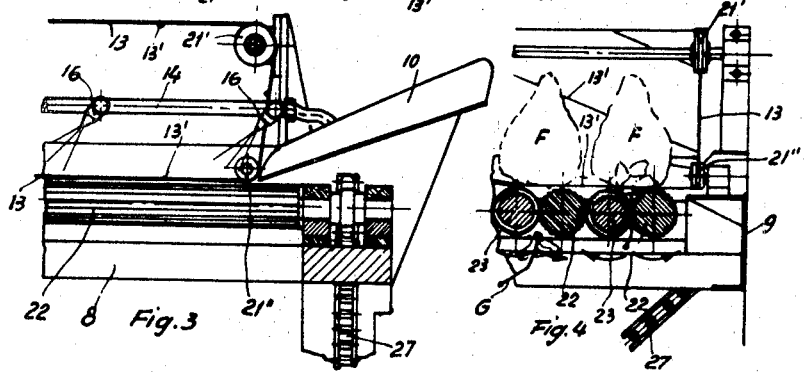
Figure 5:
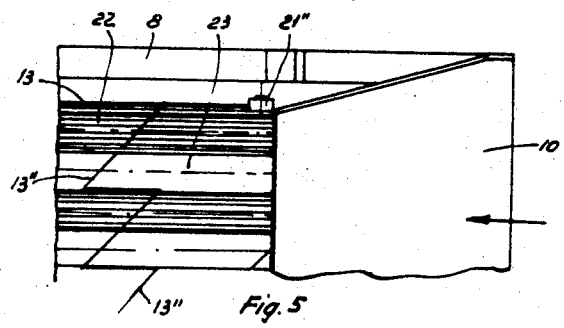
Figure 6:
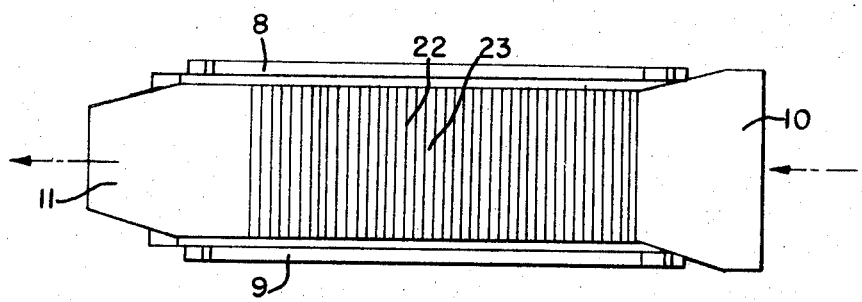
Figure 7:
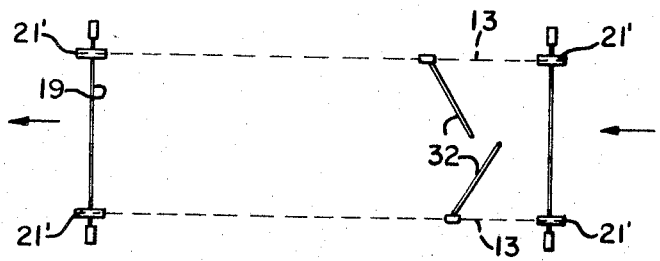
Figure 8:
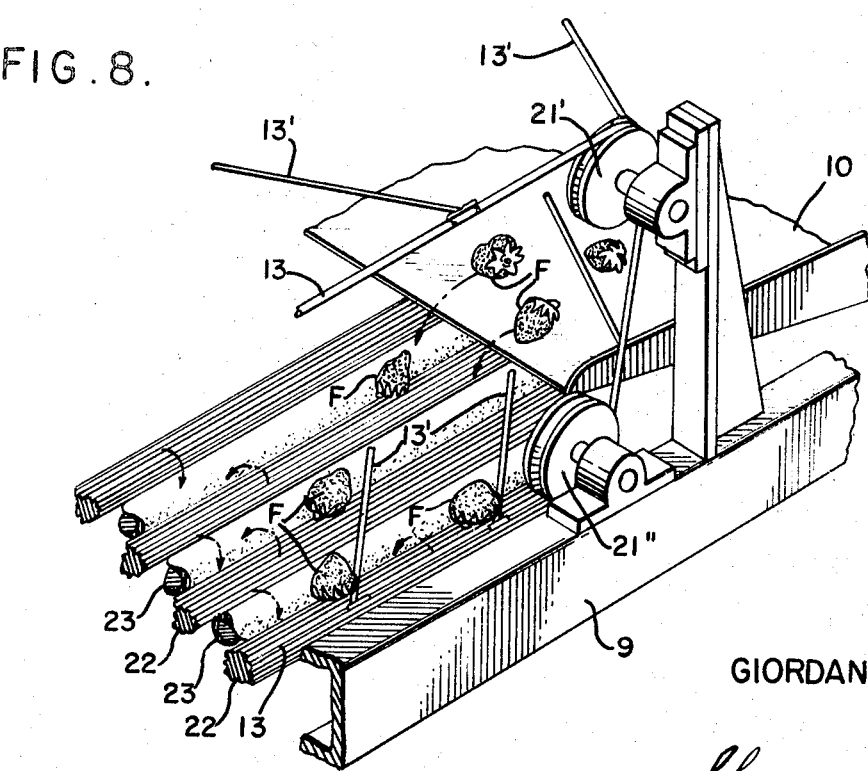

Other features and objects of the invention will be set forth during the course of the following description which is to be considered by way of example only, and which is not to be limiting in the scope of the claims and in which there are illustrated several preferred types of design in which:

FIG. 1 is a longitudinal section of the device taken on the line x—x of FIG. 2;
FIG. 2 is a top plan view;
FIG. 3 is an enlarged sectional view of the feed end;
FIG. 4 is an enlarged sectional view taken on line y—y of FIG. 2;
FIG. 5 is an enlarged top plan view with portions cut away of the feed in end of the apparatus;
FIG. 6 is a top plan view similar to FIG. 2 but showing a modification of that figure;
FIG. 7 is a schematic view as seen in a top plan of a modification of the fruit engaging members of FIG. 1;
FIG. 8 is a schematic perspective view of the berry destemming device of FIG. 4.

In the drawings, like or equivalent parts carry the same reference characters throughout the drawings.

The apparatus comprises a machine having upright supports 6 which are connected to one another by girders 7 positioned adjacent the bottom thereof and side bars 8 and 9 at the upper part thereof. One end of the machine has a feed slide 10 by means of which the fruits or berries are fed into the machine while the other end has an unloading chute 11. Both the inlet and unloading chutes are supported between the side bars 8 and 9. The working base of the apparatus as shown in FIG. 1 is inclined downwardly from the feed chute 10 to the outlet chute 11.

A pair of flexible endless belts 13 are positioned above the working surface and carry thereon a series of spaced metallic thin wire-like bars 13' which are arranged parallel to the plane of the working surface and obliquely with respect to the longitudinal axis of the machine and which engage the fruit below the center thereof, the purpose of which will be hereinafter explained.

Tubes 14 are positioned above the working surface and between the side bars 8 and 9, the tubes being provided with rotating spraying devices 16. The tubes 14 are connected to a water supply, not shown, which water is admitted through the spraying devices 16 to cleanse and wash the fruits or berries as they are carried down the working surface by the metallic fruit engaging members.

A motor 17 mounted on a support 18 is connected to the lower girders 7 and is connected through a belt drive to a shaft 19. Shaft 19 has a pulley 20 mounted thereon which is driven by the belt from the motor 17. Shaft 19 also carries a pulley 21 which is connected by a belt to a second shaft 19' which carries a pair of pulleys 21'. The endless belts 13 are trained over the pulleys 21' and receive their power therefrom. Idler pulleys 21" are provided at spaced points over which the belts 13 are run and which hold the belts in their operative position with respect to the working surface.

As can best be seen in FIGS. 3, 4 and 8, pulleys 21", belts 13 and the fruit engaging members are mounted immediately above the plane of the working surface.

The working surface or bed of the machine comprises sets of rollers, one set of which 22 is grooved longitudinally thereby providing a gripping and pulling surface. Mounted between the sets of rollers 22 and engaged thereby is the second set of rollers 23 which are covered with rubber or equivalent material and which present a smooth surface. A motor 25 supported on the framework rotates a shaft 26 which is supported at both ends on the shaft and which carries driving means thereon engaging chains 27. Each of the sets of rollers 22 and 23 have sprocket teeth thereon which are engaged by the chains 27 and are driven thereby. The rollers are caused to rotate by the chains according to any type of motion either continuous, intermittent or swinging movement.

The fruit is fed into the destemming device by dumping the same on the inlet chute 10 whereupon the fruit or berry is allowed to slide off the same onto the sets of rollers 22 and 23. If the fruit F of FIG. 4, shown there as a strawberry, achieves the position shown the stem will be grasped between the grooved roller 22 and the smooth roller 23 and by virtue of the rotation of the rollers will be pulled downwardly with respect to FIG. 4. The fruit also will be engaged below the center thereof by the diagonal bars 13' carried by the endless belts 13, which will be moving in a direction toward the outlet end and will bend the fruit slightly inasmuch as it is held against movement by virtue of the stem being engaged by the rollers and will aid the rollers in removing the stem from the berry with much less force than is required if the fruit were not moved slightly from the vertical position. Also, the bars 13' in moving the berry from its slightly vertical position exert a lifting action on the berry which aids in preventing the rollers during their pulling action from causing the stem end of the fruit to be pulled to such an extent that it will be engaged by the rollers which were it not for the bars 13' would damage or bruise the fruit.

The fruit, with the aid of gravity due to the inclination of the rollers and the pushing action of the fruit engaging members, is advanced from the inlet to the outlet of the destemming device. The spacing of the fruit engaging members immediately above and closely adjacent to the rollers 22 and 23, as seen best in FIGS. 3 and 4, results in the fruit being tumbled or jumped relative to the rollers as the fruit engaging members push the fruit away from the stem which is caught between rollers 22 and 23 during the destemming operation. This jumping or tumbling action is a result of the unique construction of the fruit engaging means which in each of its embodiments comprises essentially a thin wire-like member disposed immediately above and parallel to the bed of the machine and carried therealong by endless belts or chains or the like 13. Each of the fruit engaging means is spaced from the bed of the machine a distance less than the center of the fruit engaged thereby, as seen in FIGS. 3, 4 and 8, so that the fruit is caused to tumble between the fruit engaging means and is thus repeatedly lifted or jumped from the bed of the machine as it progresses therealong.

While the fruit is traveling down the inclined destemming device, it is being washed by the spray being emitted from the spraying device 16. Also, due to the fruit being tumbled about between the fruit engaging members the entire surface thereof may be washed and will also orient the same to a position wherein any stems which have not been removed will be engaged by the rollers and the same action as described above will take place.

The belt 13 may take the form of endless chains which are trained over the pulleys 21' and 21" and have connected between them various configurations for engaging the fruit or berry in the manner heretofore described. Another form of the invention is shown schematically in FIG. 7 and comprises a plurality of diagonal bars 32 carried by the flexible belts 13 and oriented in a convergent manner as opposed to the parallel arrangement of bars 13' in FIG. 1.

I claim:
1. A machine for destemming fruits and berries comprising:
 (a) a supporting frame;
 (b) a bed on the frame comprising a plurality of rollers arranged in pairs, one of the rollers in each pair having a smooth resilient surface and the other having a longitudinally grooved surface, the rollers of each pair rotating in opposite directions;
 (c) means for rotating the rollers;
 (d) feeding means on the frame for feeding the fruits and berries to the rollers, the rollers engaging the stems of the fruit and berries and exerting a pulling action thereon; and
 (e) fruit engaging means carried by the frame and comprising a pair of power driven endless belts disposed on opposite sides of the bed, each belt carrying a plurality of thin, wire-like bars affixed at one end to the associated belt and extending inwardly over and parallel to the bed at least half the distance between the belts and engaging the fruit and berries below the center thereof thus exerting a lifting action thereon and holding the fruit and berries against the pull of the rollers and also causing the fruit and berries to jump and tumble over the bed and to be displaced from their vertical position to aid in the destemming thereof.

2. A machine as set forth in claim 1, wherein:
 (a) the bars of each belt are parallel to each other and extend inwardly toward and intermediate the bars of the other belt.

3. A machine as set forth in claim 1, wherein:
 (a) the bars of each belt are connected to each belt approximately opposite each other and together form a convergence over the rollers.

References Cited

UNITED STATES PATENTS

| | | | |
|---|---|---|---|
| 2,527,182 | 10/1950 | Gaddie | 146—55 |
| 2,601,055 | 6/1952 | Rahal | 146—55 |
| 2,703,125 | 3/1955 | Dodgen | 146—55 |
| 2,966,185 | 12/1960 | Leinweber | 146—55 |
| 3,176,739 | 4/1965 | Minera | 146—55 X |

W. GRAYDON ABERCROMBIE, Primary Examiner